(12) United States Patent
Yamazaki et al.

(10) Patent No.: US 8,748,035 B2
(45) Date of Patent: Jun. 10, 2014

(54) BATTERY, VEHICLE, AND BATTERY-MOUNTING DEVICE

(75) Inventors: Hikohito Yamazaki, Toyota (JP); Kaoru Yugahara, Toyota (JP); Jumpei Iijima, Miyoshi (JP); Takashi Harayama, Toyota (JP); Masato Komatsuki, Gifu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 136 days.

(21) Appl. No.: 13/392,170

(22) PCT Filed: Aug. 28, 2009

(86) PCT No.: PCT/JP2009/065032
§ 371 (c)(1),
(2), (4) Date: Feb. 24, 2012

(87) PCT Pub. No.: WO2011/024286
PCT Pub. Date: Mar. 3, 2011

(65) Prior Publication Data
US 2012/0156536 A1  Jun. 21, 2012

(51) Int. Cl.
*H01M 2/08* (2006.01)

(52) U.S. Cl.
USPC ........... 429/185; 429/181; 429/171; 429/184; 429/96

(58) Field of Classification Search
USPC ................. 429/96, 181, 171, 185, 180, 184
See application file for complete search history.

(56) References Cited

U.S. PATENT DOCUMENTS

| | | | |
|---|---|---|---|
| 4,934,306 A * | 6/1990 | Rudolph | 118/58 |
| 2002/0012804 A1 * | 1/2002 | Heimann et al. | 428/450 |
| 2008/0213657 A1 * | 9/2008 | Qi et al. | 429/178 |

FOREIGN PATENT DOCUMENTS

| | | |
|---|---|---|
| CN | 1819741 | 8/2006 |
| JP | 5-51671 | 8/1993 |
| JP | 2001-59181 | 3/2001 |
| JP | 2001-200374 | 7/2001 |
| JP | 2001-216951 | 8/2001 |
| JP | 2007-179793 | 7/2007 |
| JP | 2007-221099 | 8/2007 |
| JP | 2008-27823 | 2/2008 |
| JP | 2008-103268 | 5/2008 |
| JP | 2009-37817 | 2/2009 |
| WO | WO 2006092104 * | 9/2006 |
| WO | WO 2010/095224 A1 | 8/2010 |

OTHER PUBLICATIONS

International Search Report in International Application No. PCT/JP2009/065032; Mailing Date: Nov. 24, 2009.

* cited by examiner

*Primary Examiner* — Mark F Huff
*Assistant Examiner* — Olatunji Godo
(74) *Attorney, Agent, or Firm* — Finnegan, Henderson, Farabow, Garrett & Dunner, LLP

(57) ABSTRACT

An object is to provide a battery with good durability, and a vehicle and a battery-mounting device each having such a battery mounted therein. A battery includes a positive electrode terminal member made of aluminum, a negative electrode terminal member made of copper, a positive electrode resin member made of an insulating resin, covering a part of the terminal member in tight contact therewith, and a negative resin member made of an insulating resin, covering a part of the terminal member in tight contact therewith. A positive electrode resin adhesion surface and a negative electrode resin adhesion surface each have been subjected to a surface treatment. A negative electrode sealing length of a shortest path of negative seal paths is longer than a positive electrode sealing length of a shortest path of positive electrode seal paths.

9 Claims, 10 Drawing Sheets

BATTERY, VEHICLE, AND BATTERY-MOUNTING DEVICE

CROSS-REFERENCE TO RELATED APPLICATIONS

This application is a national phase application of International Application No. PCT/JP2009/065032, filed Aug. 28, 2009, the contents of which are incorporated herein by reference.

TECHNICAL FIELD

The present invention relates to a battery including a positive electrode terminal member made of aluminum and extending from the inside to the outside of a battery case, a negative electrode terminal member made of copper and extending from the inside to the outside of the battery case, a positive electrode resin member covering the periphery of part of the positive electrode terminal member in tight contact therewith, and a negative electrode resin member covering the periphery of part of the negative electrode terminal member in tight contact therewith, a vehicle and a battery-mounting device each having this battery mounted thereon.

BACKGROUND ART

The spread of portable electronic equipment such as mobile phones, notebook PCs, and video camcorders, and vehicles such as hybrid electric vehicles in recent years has increased the demand for batteries used as the drive power source of these devices.

Some of such batteries include two electrode terminal members (positive and negative electrode terminal members) electrically connected to a power generating element inside the battery and extending to the outside of a battery case.

Patent Document 1, for example, discloses an upper lid for a lithium battery having a metal plate-like lid member, two electrode terminals (positive and negative electrode terminal members) each passed through a respective one of two through holes formed in this lid member, and two insulating hermetic seal members (positive and negative electrode resin members) insert-molded between the lid member and respective electrode terminals to provide electrical insulation therebetween and to secure them integrally. The two electrode terminals and the two insulating hermetic seal members in this upper lid, of both the positive and negative electrodes, have the same shape.

Patent Document: JP 2007-179793A

DISCLOSURE OF THE INVENTION

Problems to be Solved by the Invention

Research conducted by the present inventors has revealed that adhesion (sealing properties) between the negative electrode resin member and the negative electrode terminal member is more prone to deterioration than the sealing properties between the positive electrode resin member and the positive electrode terminal member. It has also been found out that, because of this, if, for example, the positive and negative electrode resin members and the positive and negative electrode terminal members are each formed in the same shapes, the sealing properties between the negative electrode resin member and the negative electrode terminal member deteriorate first, as a result of which, even though the sealing properties between the positive electrode resin member and the positive electrode terminal member are intact, the battery may experience a failure such as liquid electrolyte leakage or the like.

Specifically, in the battery of Patent Document 1 in which the positive and negative electrode resin members and the positive and negative electrode terminal members are each formed in the same shapes, the sealing performance (seal durability) is not well balanced between the positive and negative electrodes. For this reason, there is a risk that this battery may experience a failure such as liquid electrolyte leakage or the like as a consequence of deterioration in the sealing properties on the negative electrode side that occurs first even though the positive electrode side still has sufficient sealing properties.

The present invention was devised in view of such problem and an object of the invention is to provide a battery with good durability in which seal durability is well balanced between both electrodes such that the period in which the sealing properties between the negative electrode resin member and the negative electrode terminal member deteriorate is made concurrent with the period in which the sealing properties between the positive electrode resin member and the positive electrode terminal member deteriorate. Another object is to provide a vehicle and a battery-mounting device each having such a battery with good durability mounted thereon.

Means of Solving the Problems

One embodiment of the present invention is a battery including: a power generating element including a positive electrode plate and a negative electrode plate; a battery case accommodating the power generating element; a positive electrode terminal member made of aluminum, electrically connected to the positive electrode plate, and extending from inside to outside of the battery case; a negative electrode terminal member made of copper, electrically connected to the negative electrode plate, and extending from the inside to the outside of the battery case; a positive electrode resin member made of an insulating resin, interposed between the positive electrode terminal member and the battery case to insulate therebetween, and covering the periphery of part of the positive electrode terminal member in tight contact therewith; and a negative electrode resin member made of an insulating resin, interposed between the negative electrode terminal member and the battery case to insulate therebetween, and covering the periphery of part of the negative electrode terminal member in tight contact therewith, wherein a positive electrode resin adhesion surface of the positive electrode terminal member with which the positive electrode resin member makes tight contact, and a negative electrode resin adhesion surface of the negative electrode terminal member with which the negative electrode resin member makes tight contact, are both surface-treated to enhance adhesion with respect to the positive electrode resin member and the negative electrode resin member, and wherein a negative electrode sealing length, which is a length of the shortest one of negative electrode seal paths that run on the negative electrode resin adhesion surface from the inside to the outside of the battery case, is formed longer than a positive electrode sealing length, which is a length of the shortest one of positive electrode seal paths that run on the positive electrode resin adhesion surface from the inside to the outside of the battery case.

Research conducted by the present inventors has revealed that the seal durability between the negative electrode resin member and the negative electrode terminal member is poorer than the seal durability between the positive electrode resin member and the positive electrode terminal member. This is assumed to be because of the difference in seal durability due to the difference in surface-treated metal material. Specifically, it is attributable to a higher bond (adhesion) that aluminum, which forms the positive electrode terminal member, exhibits due to the surface treatment, than that of copper, which forms the negative electrode terminal member.

In this respect, the negative electrode sealing length (mentioned above) between the negative electrode resin member and the negative electrode terminal member is made relatively longer than the positive electrode sealing length (mentioned above) in the battery described above. Accordingly, the seal durability between the actual negative electrode resin member and the negative electrode terminal member and the seal durability between the positive electrode resin member and the positive electrode terminal member can be made about the same, whereby a balance can be achieved therebetween.

Thus occurrence of failures such as liquid electrolyte leakage that may accompany deterioration of the sealing properties on the negative electrode side is restricted, so that the battery can have good durability.

The positive electrode resin member and the negative electrode resin member may be, for example, an integrally formed one-piece component, or a component formed by two or more parts. Surface treatment techniques include, for example, organic plating and a surface treatment using a silane coupling agent.

In the battery described above, preferably, the positive electrode resin adhesion surface and the negative electrode resin adhesion surface have been subjected to organic plating.

Metal such as aluminum or copper subjected to organic plating on the surface thereof can have enhanced adhesion with a component made of an organic material such as resin.

Note, however, that according to the research conducted by the present inventors, in the battery using a positive electrode terminal member and a negative electrode terminal member with the positive electrode resin adhesion surface and the negative electrode resin adhesion surface subjected to a surface treatment by organic plating, the sealing properties of the negative electrode terminal member are more prone to deterioration than the positive electrode side.

In this respect, in the battery described above, the positive electrode resin adhesion surface and the negative electrode resin adhesion surface have been subjected to organic plating. Moreover, the negative electrode sealing length is made longer than the positive electrode sealing length. Therefore, the seal durability can be improved for both electrodes, as well as an appropriate balance can be achieved between the seal durability between the negative electrode resin member and the negative electrode terminal member and the seal durability on the positive electrode side.

Organic plating is a surface treatment wherein an alkaline or amine salt of triazinethiols, organic phosphates, or organic carboxylates is deposited on the surface of an object to be plated, using a solution of an alkaline or amine salt or the like of triazinethiols, organic phosphates, or organic carboxylates, one example being the surface treatment described in Japanese Patent No. 1840482. Electrochemical surface treatment (electroplating) methods and non-electrolytic plating methods, for example, are used for the organic plating.

In the battery described above, preferably, the positive electrode resin adhesion surface and the negative electrode resin adhesion surface have been subjected to a surface treatment with a silane coupling agent.

A silane coupling agent deposited on the surface of metal such as aluminum or copper can enhance adhesion between the metal and an organic material such as resin.

Note, however, that according to the research conducted by the present inventors, in the battery using a positive electrode terminal member and a negative electrode terminal member with the positive electrode resin adhesion surface and the negative electrode resin adhesion surface subjected to a surface treatment with a silane coupling agent, the sealing properties of the negative electrode terminal member are more prone to deterioration than the positive electrode side.

In this respect, in the battery described above, the positive electrode resin adhesion surface and the negative electrode resin adhesion surface have been subjected to a surface treatment with a silane coupling agent. Moreover, the negative electrode sealing length is made longer than the positive electrode sealing length. Therefore, the seal durability can be improved for both electrodes, as well as an appropriate balance can be achieved between the seal durability between the negative electrode resin member and the negative electrode terminal member and the seal durability on the positive electrode side.

Surface treatment with a silane coupling agent is a technique for improving the joint (adhesion) between an inorganic material such as metal and an organic material by depositing a silane coupling agent on the surface of the metal.

Another aspect of the present invention is a vehicle having one of the aforementioned batteries mounted, wherein the vehicle uses electric energy generated by the battery for all or part of an energy source.

Since the vehicle has one of the aforementioned batteries mounted thereon, it is provided as a vehicle using a battery with good durability.

The vehicle may be any of the vehicles that use electric energy generated by a battery for all or part of their power sources, for example, electric cars, hybrid cars, plug-in hybrid cars, hybrid railway vehicles, fork lifts, electric wheelchairs, electric bicycles, electric scooters.

Another aspect of the present invention is a battery-mounting device having one of the aforementioned batteries mounted thereon, wherein the device uses electric energy generated by the battery for all or part of an energy source.

Since the above battery-mounting device has one of the aforementioned batteries mounted thereon, it is provided as a battery-mounting device using a battery with good durability.

The battery-mounting device may be any of the devices that have a battery mounted thereon and use it for all or part of their energy sources, including, for example, various battery-powered domestic and office appliances and industrial equipment, such as personal computers, mobile phones, battery-powered electric tools, uninterruptible power supplies.

Figure 1:
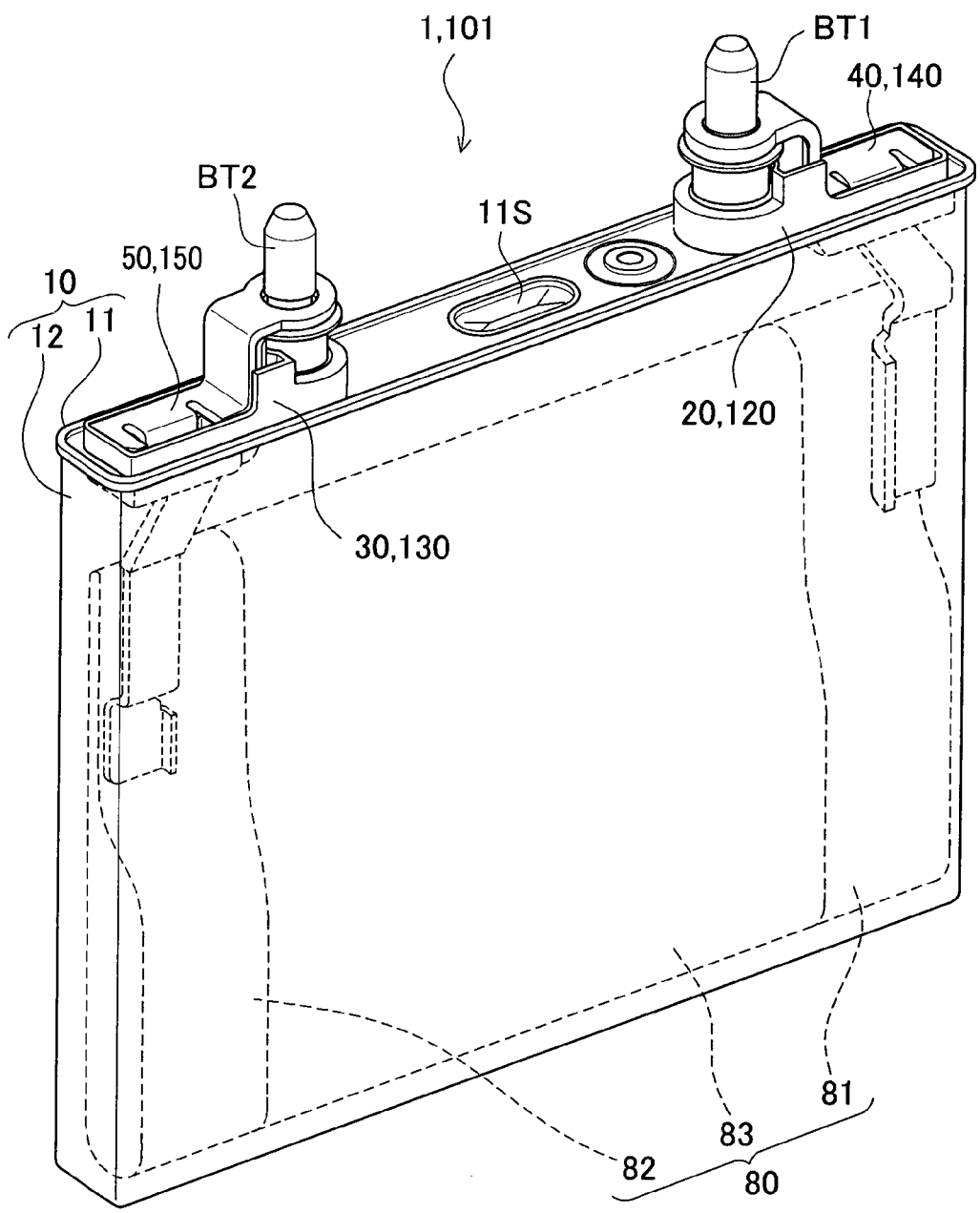
FIG. 1 is a perspective view of a battery of Embodiment 1 and Modified Embodiment 1.

DESCRIPTION OF THE REFERENCE SIGNS 1, 101 Battery
10 Battery case
20, 120 Positive electrode resin member
30, 130 Negative electrode resin member
40, 140 Positive electrode terminal member
43XF, 143XF Positive electrode resin adhesion surface
50, 150 Negative electrode terminal member
53XF, 153XF Negative electrode resin adhesion surface
80 Power generating element
81 Positive electrode plate
82 Negative electrode plate
200 Vehicle
300 Hammer drill (Battery-mounting device)
L1, L3 Positive electrode sealing length
L2, L4 Negative electrode sealing length
R1, R3 Positive electrode seal path (Shortest path (of Positive electrode seal paths))
R2, R4 Negative electrode seal path (Shortest path (of Negative electrode seal paths))

DESCRIPTION OF EMBODIMENTS

Embodiment 1

Next, Embodiment 1 of the present invention will be described with reference to the drawings.

Figure 3:
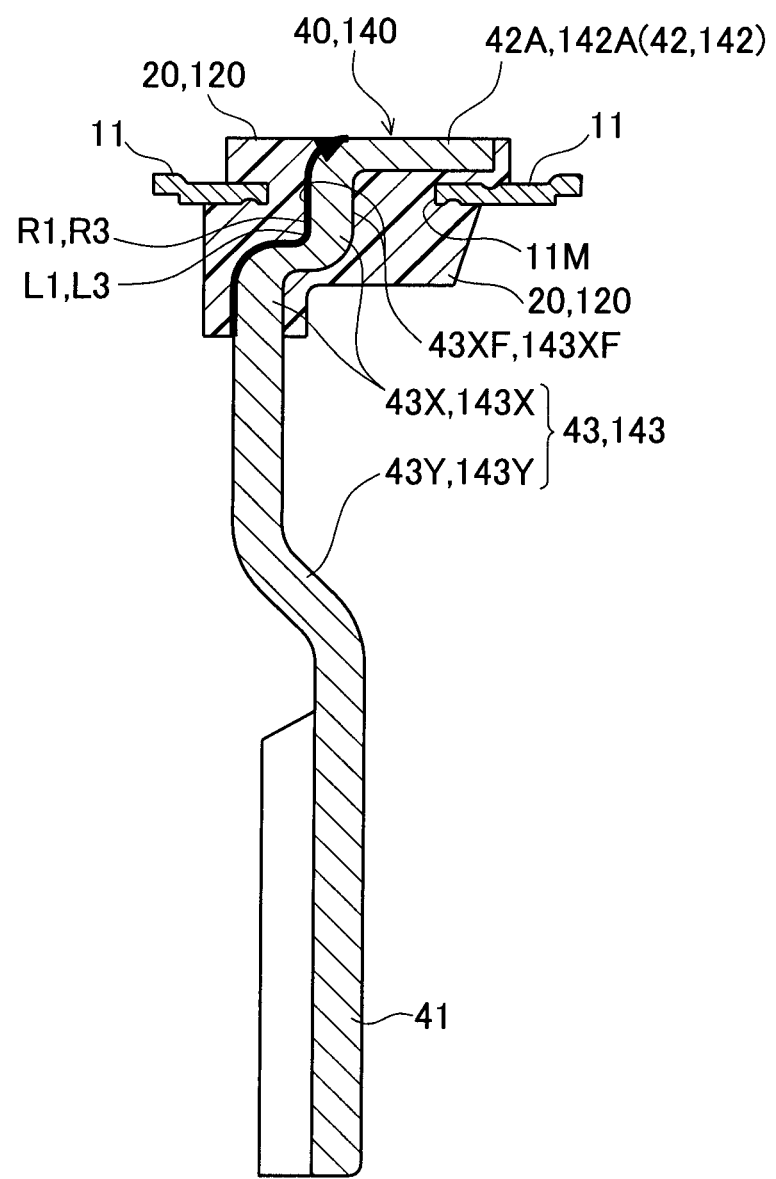
FIG. 3 is an enlarged cross-sectional view (along A-A in FIG. 2) of the battery of Embodiment 1 and Modified Embodiment 1.
Figure 4:
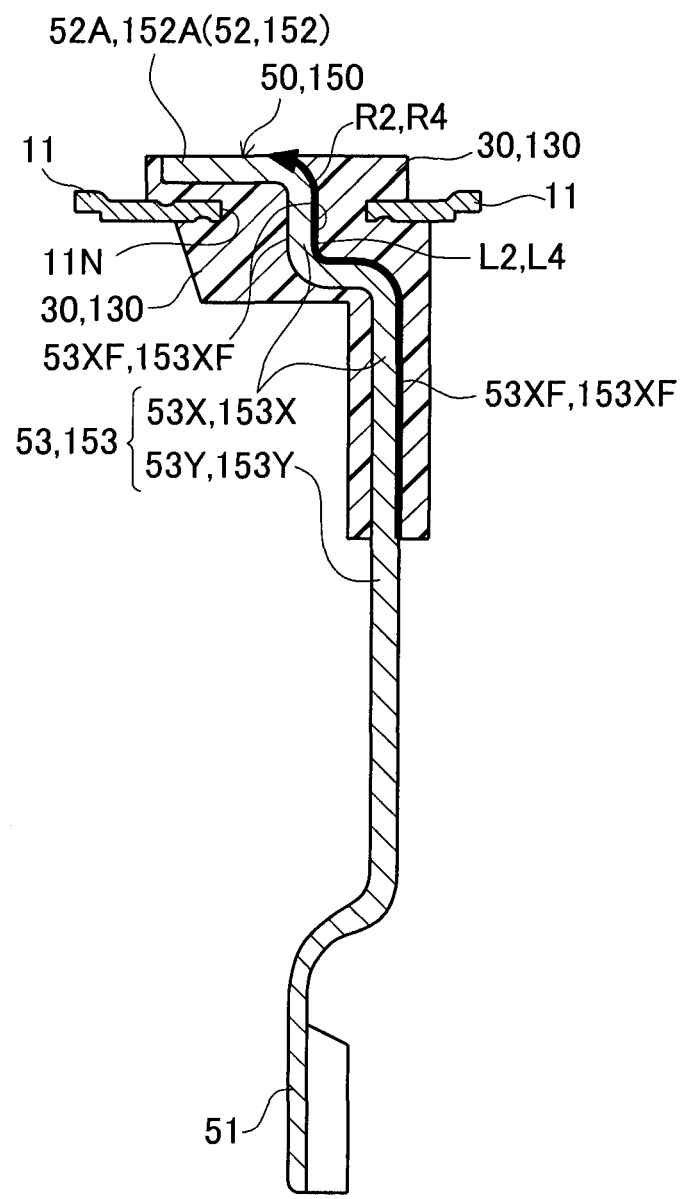
FIG. 4 is an enlarged cross-sectional view (along B-B in FIG. 2) of the battery of Embodiment 1 and Modified Embodiment 1.

First, a battery 1 according to Embodiment 1 will be described. FIG. 1 shows a perspective view of the battery 1, FIG. 2 shows a partially broken cross-sectional view of this battery 1, FIG. 3 shows a partial cross-sectional view (along A-A in FIG. 2) of the battery 1, and FIG. 4 shows a partial cross-sectional view (along B-B in FIG. 2) of the battery 1, respectively.

Figure 2:
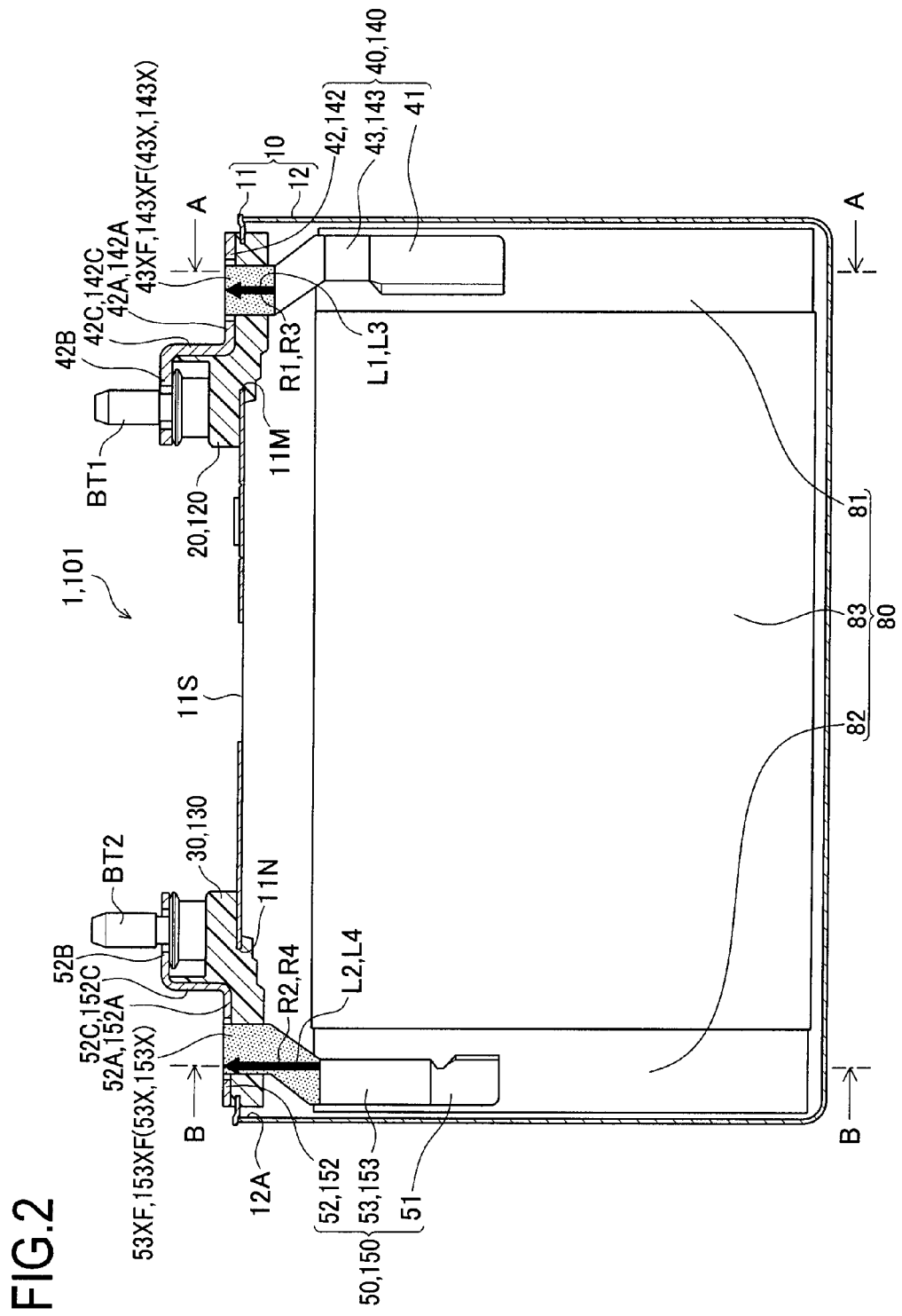
FIG. 2 is a cross-sectional view of the battery of Embodiment 1 and Modified Embodiment 1.

The battery 1 according to Embodiment 1 is a wound-type lithium ion secondary battery including a power generating element 80, a battery case 10, a positive electrode terminal member 40 and a negative electrode terminal member 50 each extending from the inside to the outside of this battery case 10, and a positive electrode resin member 20 and a negative electrode resin member 30 each made of an insulating resin (see FIGS. 1 and 2). The battery 1, in addition, includes liquid electrolyte (not shown) composed of a solute ($LiPF_6$) added to an organic solvent mixture of ethylene carbonate (EC) and ethyl methyl carbonate (EMC).

Of these, the power generating element 80 includes a strip-shaped positive electrode plate 81 and a strip-shaped negative electrode plate 82, which are wound around with strip-shaped polyethylene separators 83 interposed therebetween (see FIGS. 1 and 2).

The battery case 10, on the other hand, includes a sealing lid 11 and a battery case body 12 which are both made of aluminum (see FIGS. 1 and 2). This battery case 10 accommodates the above-described power generating element 80 (see FIG. 2). The battery case body 12 has a rectangular box shape with a bottom and an opening 12A, with an insulating film (not shown) made of resin affixed to the entire inner surface thereof.

The sealing lid 11 is a rectangular plate, which closes the opening 12A of the battery case body 12 and is welded to this case body 12. This sealing lid 11 includes a positive electrode through hole 11M through which the positive electrode terminal member 40 can extend, and a negative electrode through hole 11N through which the negative electrode terminal member 50 can extend (see FIGS. 2 to 4). This sealing lid 11 also includes a safety vent portion 11S at the center in the left and right direction in FIGS. 1 and 2. This safety vent portion 11S is a one-way type safety vent that loses its safety vent function once it opens.

Next, the positive electrode terminal member 40 will be described. This positive electrode terminal member 40 is made of aluminum and electrically connected to the positive electrode plate 81 of the power generating element 80, and extends from the inside to the outside of the battery case 10 (see FIG. 2). This positive electrode terminal member 40 includes a positive electrode terminal connecting portion 41 located at one end of the terminal member 40 inside the battery case 10 and connected to the positive electrode plate 81, and a positive electrode terminal exposed portion 42 located at the other end of the terminal member 40 and exposed outside the battery case 10. It also includes a positive electrode terminal passage portion 43 located between these connecting portion 41 and exposed portion 42 and extending through the battery case 10 while being insulated from the battery case 10 (see FIGS. 2 and 3).

The positive electrode terminal exposed portion 42 is bent in a crank shape, and formed of a positive electrode first flat plate portion 42A in the shape of a flat plate parallel to the sealing lid 11, a positive electrode second flat plate portion 42B located in an upper position in FIG. 2 than the first flat plate portion 42A, and a positive electrode connector portion 42C connecting the first flat plate portion 42A and the second flat plate portion 42B (see FIG. 2). The first flat plate portion 42A is continuous with the passage portion 43. A metal positive electrode bolt BT1 passes through the second flat plate portion 42B near the center thereof.

The positive electrode terminal passage portion 43 includes, as shown in FIG. 3, a cranked portion 43X bent in a crank shape from the positive electrode terminal exposed portion 42, and a planar extension 43Y in the shape of a flat plate extending from this cranked portion 43X toward the positive electrode terminal connecting portion 41 (downward in FIG. 3). The cranked portion 43X is surrounded and covered by the positive electrode resin member 20 in tight contact therewith. Hereinafter, this surface that the positive electrode resin member 20 is in tight contact with will be referred to as a positive electrode resin adhesion surface 43XF (see FIGS. 2 and 3).

A region in the surface of the positive electrode terminal member 40 containing this adhesion surface 43XF has been subjected to organic plating to enhance adhesion between the cranked portion 43X and the positive electrode resin member 20.

Next, the negative electrode terminal member 50 will be described. This negative electrode terminal member 50 is made of copper and electrically connected to the negative electrode plate 82 of the power generating element 80, and extends from the inside to the outside of the battery case 10 (see FIG. 2). This negative electrode terminal member 50 includes a negative electrode terminal connecting portion 51 located at one end of the terminal member 50 inside the battery case 10 and connected to the negative electrode plate 82, and a negative electrode terminal exposed portion 52 located at the other end of the terminal member 50 and exposed outside the battery case 10. It also includes a negative electrode terminal passage portion 53 located between these connecting portion 51 and exposed portion 52 and extending through the battery case 10 while being insulated from the battery case 10 (see FIGS. 2 and 4).

The negative electrode terminal exposed portion 52 is bent in a crank shape, and formed of a negative electrode first flat plate portion 52A in the shape of a flat plate parallel to the sealing lid 11, a negative electrode second flat plate portion 52B located in an upper position in FIG. 2 than the first flat plate portion 52A, and a negative electrode connector portion 52C connecting the first flat plate portion 52A and the second flat plate portion 52B (see FIG. 2). The first flat plate portion 52A is continuous with the passage portion 53. A metal negative electrode bolt BT2 passes through the second flat plate portion 52B near the center thereof.

The negative electrode terminal passage portion 53 includes, as shown in FIG. 4, a cranked portion 53X bent in a crank shape from the negative electrode terminal exposed portion 52, and a planar extension 53Y in the shape of a flat plate extending from this cranked portion 53X toward the negative electrode terminal connecting portion 51 (downward in FIG. 4). The cranked portion 53X is surrounded and covered by the negative electrode resin member 30 in tight contact therewith. Hereinafter, this surface that the negative electrode resin member 30 is in tight contact with will be referred to as a negative electrode resin adhesion surface 53XF (see FIGS. 2 and 4).

A region in the surface of the negative electrode terminal member 50 containing this adhesion surface 53XF has also been subjected to organic plating to enhance adhesion between the cranked portion 53X and the negative electrode resin member 30.

Next, the positive electrode resin member 20 will be described. This positive electrode resin member 20 is made of polyphenylene sulfide resin (hereinafter referred to also as PPS) which is an insulating resin. This positive electrode resin member 20 is interposed between the positive electrode terminal member 40 and the battery case 10 to provide insulation therebetween, as well as covers the periphery of part of the positive electrode terminal member 40 in tight contact therewith (see FIGS. 2 and 3).

More specifically, the positive electrode resin member 20 is interposed between the positive electrode first flat plate portion 42A and the positive electrode connector portion 42C of the positive electrode terminal exposed portion 42, and the cranked portion 43X of the positive electrode terminal passage portion 43, and the sealing lid 11 (see FIG. 2). The positive electrode resin member 20 covers the periphery of the cranked portion 43X of the positive electrode terminal passage portion 43 in tight contact therewith. Specifically, the positive electrode resin member 20 seals the positive electrode resin adhesion surface 43XF of the cranked portion 43X.

Here, a positive electrode seal path R1 indicated by an arrow in FIGS. 2 and 3 is the shortest one of positive electrode seal paths that run on the positive electrode resin adhesion surface 43XF from the inside to the outside of the battery case 10. A positive electrode sealing length L1 of this positive electrode seal path R1 is 4.4 mm (see FIG. 3).

Since this positive electrode seal path R1 runs on the positive electrode resin adhesion surface 43XF of the cranked portion 43X that is bent in a crank shape, the thickness in the up and down direction in FIG. 3 of the positive electrode resin member 20 can be made smaller than the positive electrode sealing length L1. Specifically, with the positive electrode terminal member 40 of the battery 1 according to Embodiment 1, a positive electrode sealing length L1 larger than the thickness in the up and down direction in FIG. 3 of the positive electrode resin member 20 can be secured.

Next, the negative electrode resin member 30 will be described. Similarly to the positive electrode side made of the insulating resin (PPS), this negative electrode resin member 30 is interposed between the negative electrode terminal member 50 and the battery case 10 to provide insulation therebetween, as well as covers the periphery of part of the negative electrode terminal member 50 in tight contact therewith (see FIGS. 2 and 4).

More specifically, the negative electrode resin member 30 is interposed between the negative electrode first flat plate portion 52A and the negative electrode connector portion 52C of the negative electrode terminal exposed portion 52, and the cranked portion 53X of the negative electrode terminal passage portion 53, and the sealing lid 11 (see FIG. 2). The negative electrode resin member 30 covers the periphery of the cranked portion 53X of the negative electrode terminal passage portion 53 in tight contact therewith. Specifically, the negative electrode resin member 30 seals the negative electrode resin adhesion surface 53XF of the cranked portion 53X.

Here, a negative electrode seal path R2 indicated by an arrow in FIGS. 2 and 4 is the shortest one of negative electrode seal paths that run on the negative electrode resin adhesion surface 53XF from the inside to the outside of the battery case 10. A negative electrode sealing length L2 of this negative electrode seal path R2 is 13.2 mm (see FIG. 4).

Since this negative electrode seal path R2 runs on the negative electrode resin adhesion surface 53XF of the cranked portion 53X that is bent in a crank shape, the thickness in the up and down direction in FIG. 4 of the negative electrode resin member 30 can be made smaller than the negative electrode sealing length L2. Specifically, with the negative electrode terminal member 50 of the battery 1 according to Embodiment 1, a negative electrode sealing length L2 larger than the thickness in the up and down direction in FIG. 4 of the negative electrode resin member 30 can be secured.

Meanwhile, the present inventors conducted the following experiment to determine the sealing properties between the positive electrode resin member 20 and the positive electrode terminal member 40, and between the negative electrode resin member 30 and the negative electrode terminal member 50.

Figure 5:
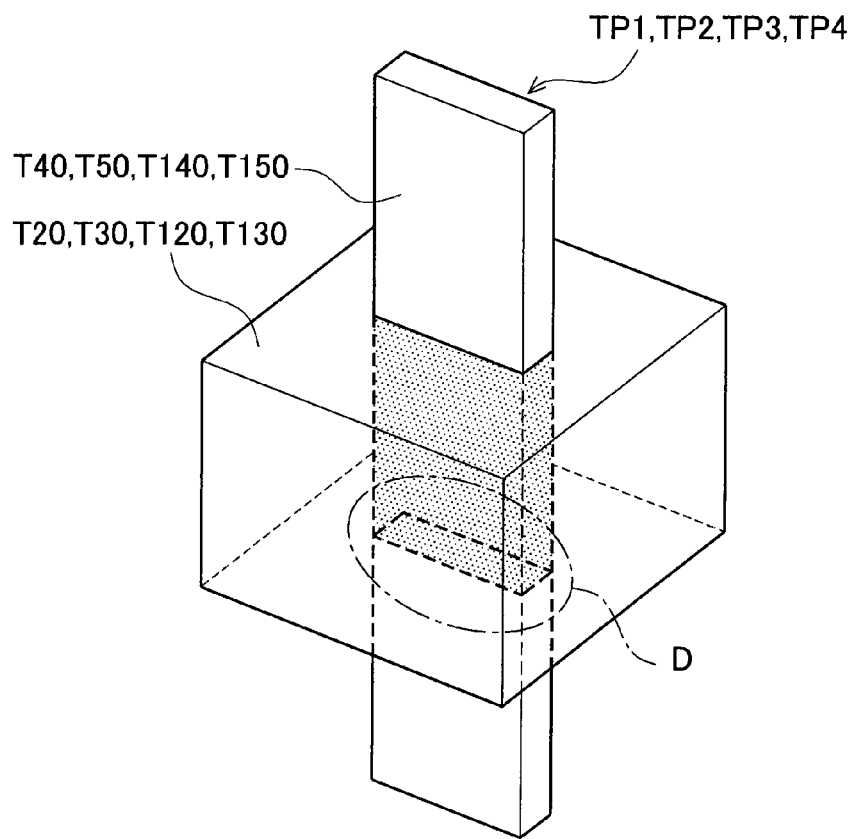
FIG. 5 is an explanatory view of an experiment to check sealing performance between a resin member and a terminal member.
Figure 6:
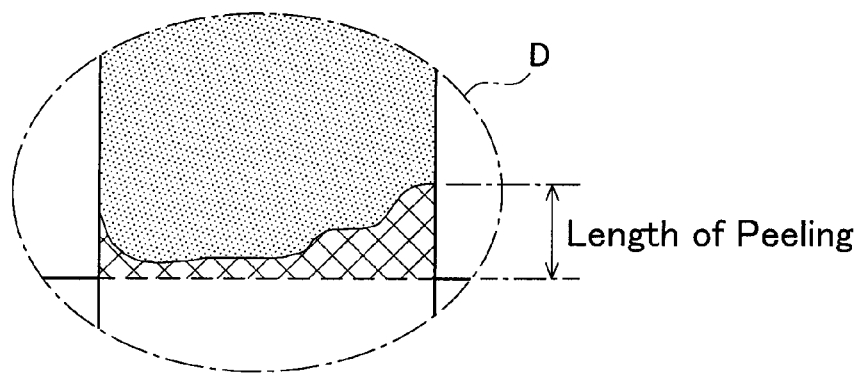
FIG. 6 is an explanatory view (an enlarged view of a part D in FIG. 5) of the experiment to check the sealing performance between the resin member and the terminal member.

More specifically, a metal plate T40 in a rectangular plate shape made of copper with a surface subjected to organic plating similarly to the positive electrode terminal member 40, and a first test piece TP1 made of a resin member T20 which is the same PPS as that of the positive electrode resin member 20 and covering the periphery of this metal plate T40 in tight contact therewith, were prepared, as shown in FIG. 5. One side of the metal plate T40 extending through the resin member T20 of this first test piece TP1 was immersed in the same liquid electrolyte (not shown) as that of the battery 1, and changes in peeling length of the seal between the metal plate T40 and the resin member T20 in accordance with the immersion time were measured. More specifically, after the first test piece TP1 was pulled up out of the liquid electrolyte, the resin member T20 was peeled off of the metal plate T40, and the portion of this metal plate T40 where the resin member T20 had adhered before the immersion was subjected to an elemental analysis (EPMA) to determine whether or not components of the liquid electrolyte (such as elemental phosphorus or elemental fluorine) exist there. If components of the liquid electrolyte exist in part of the portion where the resin member T20 had adhered before the immersion, it is assumed that the resin member T20 peeled there during the immersion, allowing ingress of the liquid electrolyte therein. The portion (region) where components of the liquid electrolyte existed is indicated with cross-hatching in FIG. 6. As the peeling length of the seal, as shown in FIG. 6, the longest one of peeling distances along the same direction as the direction in which the metal plate T40 extends was employed.

In the meantime, a metal plate T50 in a flat plate shape made of copper with a surface subjected to organic plating similarly to the negative electrode terminal member 50, and a second test piece TP2 made of a resin member T30 which is the same PPS as that of the negative electrode resin member 30, were prepared, and similarly to the first test piece TP1, changes in peeling length of the seal between the metal plate T50 and the resin member T30 in accordance with the immersion time were measured.

Figure 7:
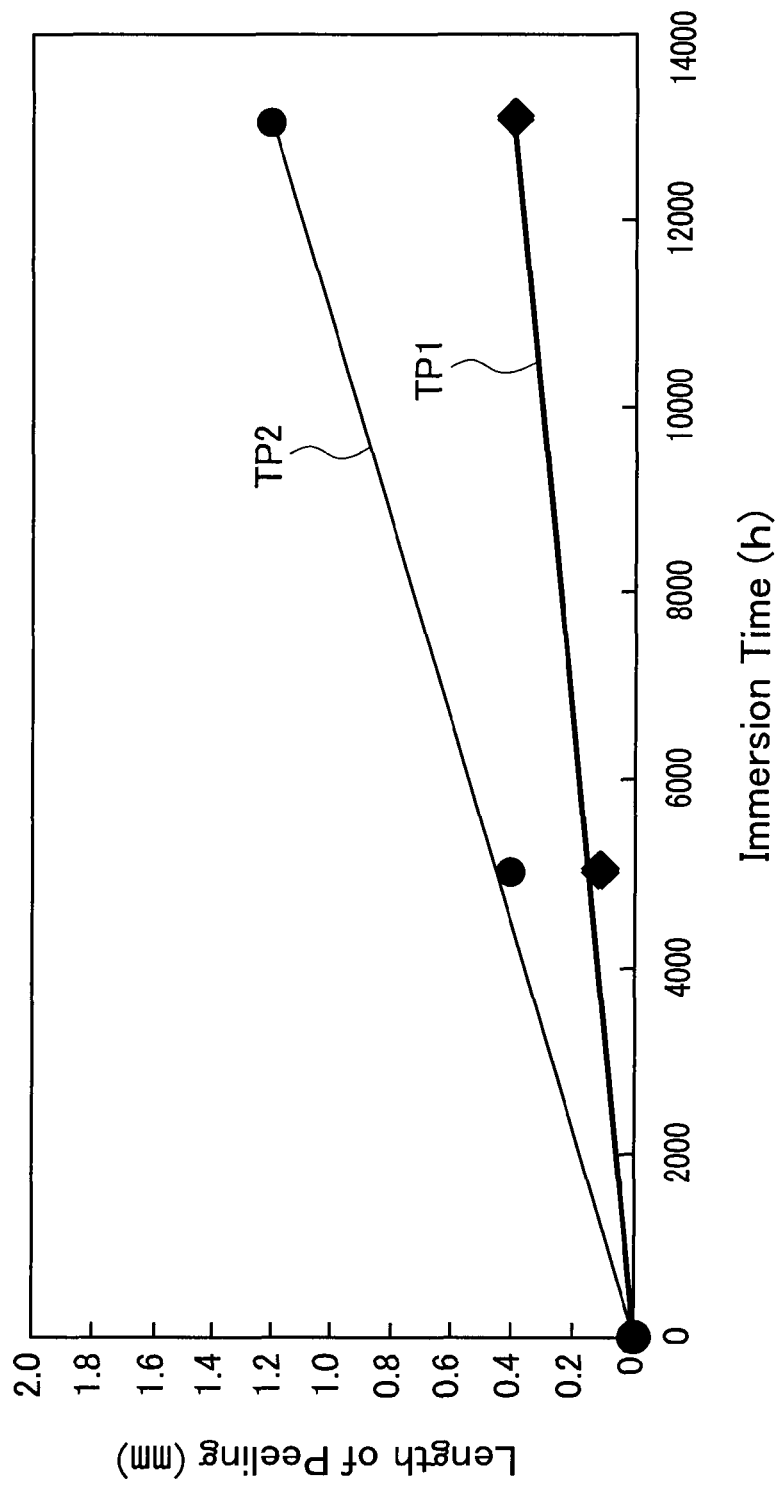
FIG. 7 is a graph showing a relationship between the sealing performance between the resin member and the terminal member and immersion time.

The measurement results are shown in FIG. 7.

The peeling lengths of the first test piece TP1 and the second test piece TP2 both increased linearly as the immersion time increased. The graph representing the second test piece TP2 is constantly located higher than the graph of the first test piece TP1. This indicates that the sealing performance between the negative electrode resin member 30 and the negative electrode terminal member 50 simulated by the second test piece TP2 deteriorates earlier than the sealing performance between the positive electrode resin member 20 and the positive electrode terminal member 40 simulated by the first test piece TP1. Specifically, it indicates that the seal durability between the negative electrode resin member 30 and the negative electrode terminal member 50 is poorer than the seal durability between the positive electrode resin member 20 and the positive electrode terminal member 40.

Based on the above results, the negative electrode sealing length L2 (12.3 mm) in the negative electrode terminal member 50 of the battery 1 according to Embodiment 1 is made longer than the positive electrode sealing length L1 (4.4 mm) in the positive electrode terminal member 40 (L2>L1). These values of the positive electrode sealing length L1 and the negative electrode sealing length L2 were determined in consideration of the balance of the seal durability between the positive electrode and the negative electrode.

Therefore, the seal durability between the negative electrode resin member 30 and the negative electrode terminal member 50 and the seal durability between the positive electrode resin member 20 and the positive electrode terminal member 40 are made about the same in the battery 1, whereby a balance can be achieved therebetween.

Thus occurrence of failures such as liquid electrolyte leakage that may accompany deterioration of the sealing properties between the negative electrode resin member 30 and the negative electrode terminal member 50 is restricted, so that the battery 1 can have good durability.

Moreover, in this battery 1, the positive electrode resin adhesion surface 43XF and the negative electrode resin adhesion surface 53XF have been subjected to organic plating. Furthermore, the negative electrode sealing length L2 is made longer than the positive electrode sealing length L1. Therefore, the seal durability of both (positive and negative) electrodes can be improved, and also an appropriate balance can be achieved between the seal durability between the negative electrode resin member 30 and the negative electrode terminal member 50 and the seal durability on the positive electrode side.

Figure 8:
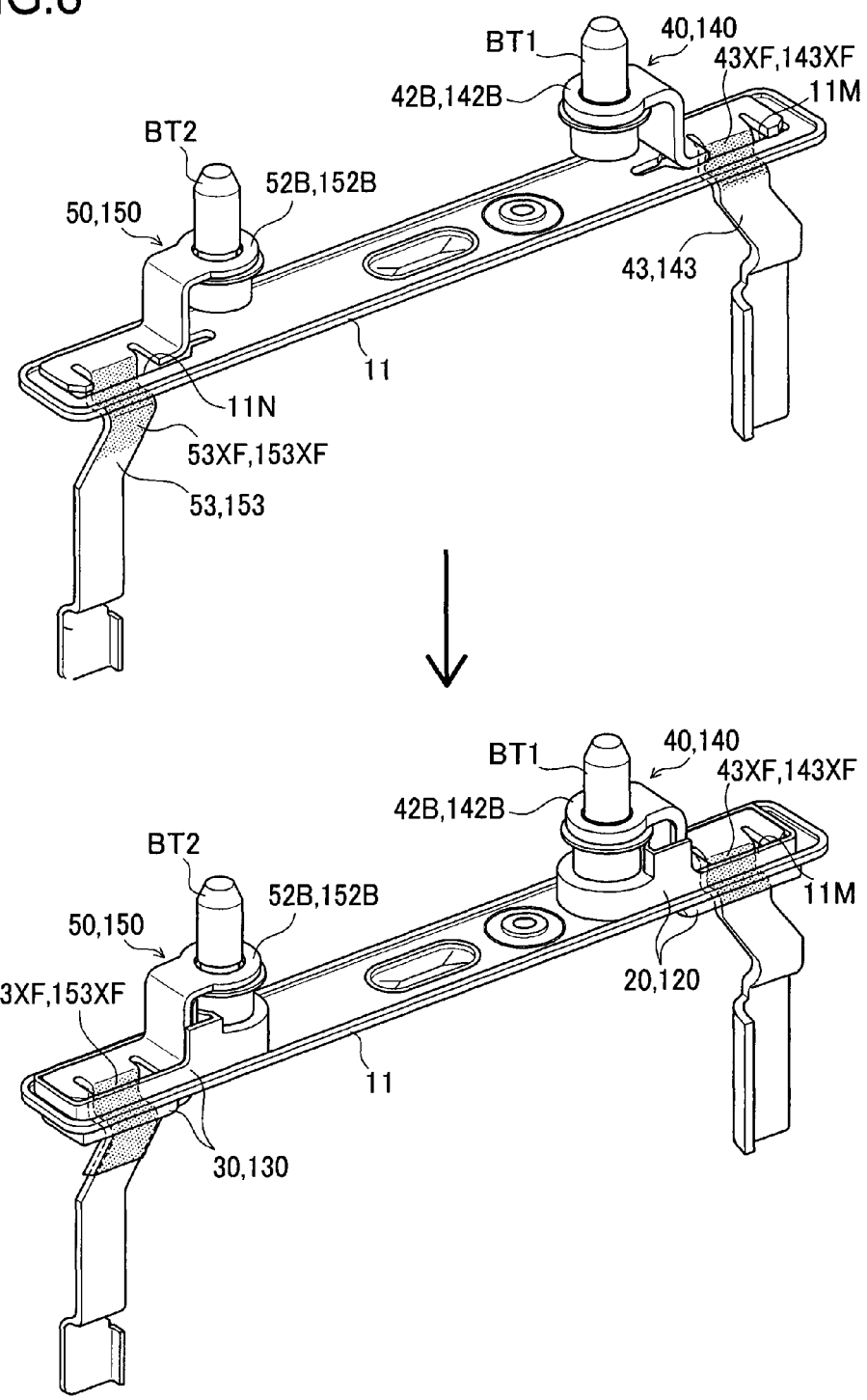
FIG. 8 is an explanatory view of a manufacturing method of the battery of Embodiment 1 and Modified Embodiment 1.

Next, a method for manufacturing the battery 1 according to Embodiment 1 will be described with reference to FIG. 8. First, the step of securing the positive electrode terminal member 40 and the negative electrode terminal member 50 to the sealing lid 11 will be described. A region of the positive electrode terminal member 40 that forms the positive electrode resin adhesion surface 43XF, and a region of the negative electrode terminal member 50 that forms the negative electrode resin adhesion surface 53XF have both been subjected to organic plating. For this organic plating, an organic solution (with a concentration of 5 weight %) of triazine-trithione monosodium salt and 2-(methylaminomethyl) phenol dissolved in an organic solvent (not shown) was used. The positive electrode terminal member 40 (or negative electrode terminal member 50) was immersed for one minute in this organic solution prepared at 55° C. to apply organic plating on the surface of this positive electrode terminal member 40 (or negative electrode terminal member 50).

The positive electrode bolt BT1 is passed through the positive electrode second flat plate portion 42B of the positive electrode terminal member 40 and the negative electrode bolt BT2 is passed through the negative electrode second flat plate portion 52B of the negative electrode terminal member 50, respectively. The positive electrode terminal passage portion 43 of the positive electrode terminal member 40 is passed through the positive electrode through hole 11M and the negative electrode terminal passage portion 53 of the negative electrode terminal member 50 is passed through the negative electrode through hole 11N of the sealing lid 11, respectively (see upper figure in FIG. 8).

Next, the positive electrode resin member 20 and the negative electrode resin member 30 are each formed by one injection molding process. This positive electrode resin member 20 unites the positive electrode terminal member 40, the positive electrode bolt BT1, and the sealing lid 11, so that the positive electrode terminal member 40 is secured to the sealing lid 11 while extending therethrough (see lower figure in FIG. 8). Also, the negative electrode resin member 30 unites the negative electrode terminal member 50, the negative electrode bolt BT2, and the sealing lid 11, so that the negative electrode terminal member 50 is secured to the sealing lid 11 while extending therethrough.

The positive electrode resin member 20 makes tight contact with the positive electrode first flat plate portion 42A and the positive electrode connector portion 42C of the positive electrode terminal exposed portion 42, and the cranked portion 43X of the positive electrode passage portion 43. The positive electrode resin member 20 covers the periphery of the cranked portion 43X of the positive electrode passage portion 43 in tight contact therewith. Specifically, the positive electrode resin member 20 makes tight contact with the region of the positive electrode terminal member 40 that forms the positive electrode resin adhesion surface 43XF.

The negative electrode resin member 30 makes tight contact with the negative electrode first flat plate portion 52A and the negative electrode connector portion 52C of the negative electrode terminal exposed portion 52, and the cranked portion 53X of the negative electrode passage portion 53. The negative electrode resin member 30 covers the periphery of the cranked portion 53X of the negative electrode passage portion 53 in tight contact therewith. Specifically, the negative electrode resin member 30 makes tight contact with the region of the negative electrode terminal member 50 that forms the negative electrode resin adhesion surface 53XF.

After the positive electrode terminal member 40 and the negative electrode terminal member 50 have been secured to the sealing lid 11, the positive electrode terminal connecting portion 41 of the positive electrode terminal member 40 mentioned above and the negative electrode terminal connecting portion 51 of the negative electrode terminal member 50 are welded respectively to the positive electrode plate 81 and the negative electrode plate 82 of the power generating element 80. The power generating element 80 is then accommodated in the battery case body 12. The sealing lid 11 and the battery case body 12 are welded together to form the battery case 10. Liquid electrolyte (not shown) is poured into this battery case 10, whereby the battery 1 according to Embodiment 1 is complete (see FIG. 1).

Modified Embodiment 1

Next, a battery 101 according to Modified Embodiment 1 of the present invention will be described with reference to FIGS. 1 to 6, 8 and 9.

The battery 101 of Modified Embodiment 1 is different from the foregoing Embodiment 1 in that the positive electrode resin adhesion surface of the positive electrode terminal member and the negative electrode resin adhesion surface of the negative electrode terminal member have been subjected to a surface treatment with a silane coupling agent, and is otherwise the same.

Therefore, the difference from Embodiment 1 will be mainly described and description of similar parts will be omitted or simplified. Same parts provide the same advantageous effects. Description will be made with the same reference numerals given to the same features.

The battery 101 according to Modified Embodiment 1 is a wound-type lithium ion secondary battery including a power generating element 80, a battery case 10, a positive electrode terminal member 140 and a negative electrode terminal member 150 each extending from the inside to the outside of this battery case 10, and a positive electrode resin member 120 and a negative electrode resin member 130 each made of an insulating resin (see FIGS. 1 and 2). The battery 101, in addition, includes the same liquid electrolyte (not shown) as that of Embodiment 1.

A region in the surface of the positive electrode terminal member 140 including a positive electrode resin adhesion surface 143XF has been coated with a silane coupling agent to enhance adhesion between a cranked portion 143X and the positive electrode resin member 120. A region in the surface of the negative electrode terminal member 150 including a negative electrode resin adhesion surface 153XF has been coated with a silane coupling agent to enhance adhesion between a cranked portion 153X and the negative electrode resin member 130.

The positive electrode resin member 120 made of PPS is interposed between the positive electrode terminal member 140 and the battery case 10 to provide insulation therebetween, as well as covers the periphery of part of the positive electrode terminal member 140 in tight contact therewith (see FIGS. 2 and 3).

More specifically, the positive electrode resin member 120 is interposed between a positive electrode first flat plate portion 142A and a positive electrode connector portion 142C of the positive electrode terminal exposed portion 142, and the cranked portion 143X of the positive electrode terminal passage portion 143, and the sealing lid 11 (see FIG. 2). The positive electrode resin member 120 covers the periphery of the cranked portion 143X of the positive electrode terminal passage portion 143 in tight contact therewith. Specifically, the positive electrode resin member 120 seals the positive electrode resin adhesion surface 143XF of the cranked portion 143X.

Here, a positive electrode seal path R3 indicated by an arrow in FIGS. 2 and 3 is the shortest one of positive electrode seal paths that run on the positive electrode resin adhesion surface 143XF from the inside to the outside of the battery case 10. The positive electrode sealing length L3 of this positive electrode seal path R3 is 6.3 mm (see FIG. 3).

Similarly to the positive electrode side, the negative electrode resin member 130 is interposed between the negative electrode terminal member 150 and the battery case 10 to provide insulation therebetween, as well as covers the periphery of part of the negative electrode terminal member 150 in tight contact therewith (see FIGS. 2 and 4).

More specifically, the negative electrode resin member 130 is interposed between a negative electrode first flat plate portion 152A and a negative electrode connector portion 152C of the negative electrode terminal exposed portion 152, and the cranked portion 153X of the negative electrode terminal passage portion 153, and the sealing lid 11 (see FIG. 2). The negative electrode resin member 130 covers the periphery of the cranked portion 153X of the negative electrode terminal passage portion 153 in tight contact therewith. Specifically, the negative electrode resin member 130 seals the negative electrode resin adhesion surface 153XF of the cranked portion 153X.

Here, a negative electrode seal path R4 indicated by an arrow in FIGS. 2 and 4 is the shortest one of negative electrode seal paths that run on the negative electrode resin adhesion surface 153XF from the inside to the outside of the battery case 10. The negative electrode sealing length L4 of this negative electrode seal path R4 is 7.0 mm (see FIG. 4).

Meanwhile, the present inventors conducted an experiment similar to that of Embodiment 1 to determine the sealing properties between the positive electrode resin member 120 and the positive electrode terminal member 140, and between the negative electrode resin member 130 and the negative electrode terminal member 150.

More specifically, a metal plate T140 in a rectangular plate shape made of aluminum with a surface coated with a silane coupling agent similarly to the positive electrode terminal member 140, and a third test piece TP3 made of a resin member T120 which is the same PPS as that of the positive electrode resin member 120 and covering the periphery of this metal plate T140 in tight contact therewith, were prepared, as shown in FIG. 5. One side of the metal plate T140 extending through the resin member T120 of this third test piece TP3 was immersed in the same liquid electrolyte (not shown) as that of the battery 101, and changes in peeling length of the seal between the metal plate T140 and the resin member T120 in accordance with the immersion time were measured.

In the meantime, a metal plate T150 made of copper with a surface coated with a silane coupling agent similarly to the negative electrode terminal member 150, and a fourth test piece TP4 made of a resin member T130 which is the same PPS as that of the negative electrode resin member 130, were prepared, and similarly to the third test piece TP3, changes in peeling length of the seal between the metal plate T150 and the resin member T130 in accordance with the immersion time were measured.

Figure 9:
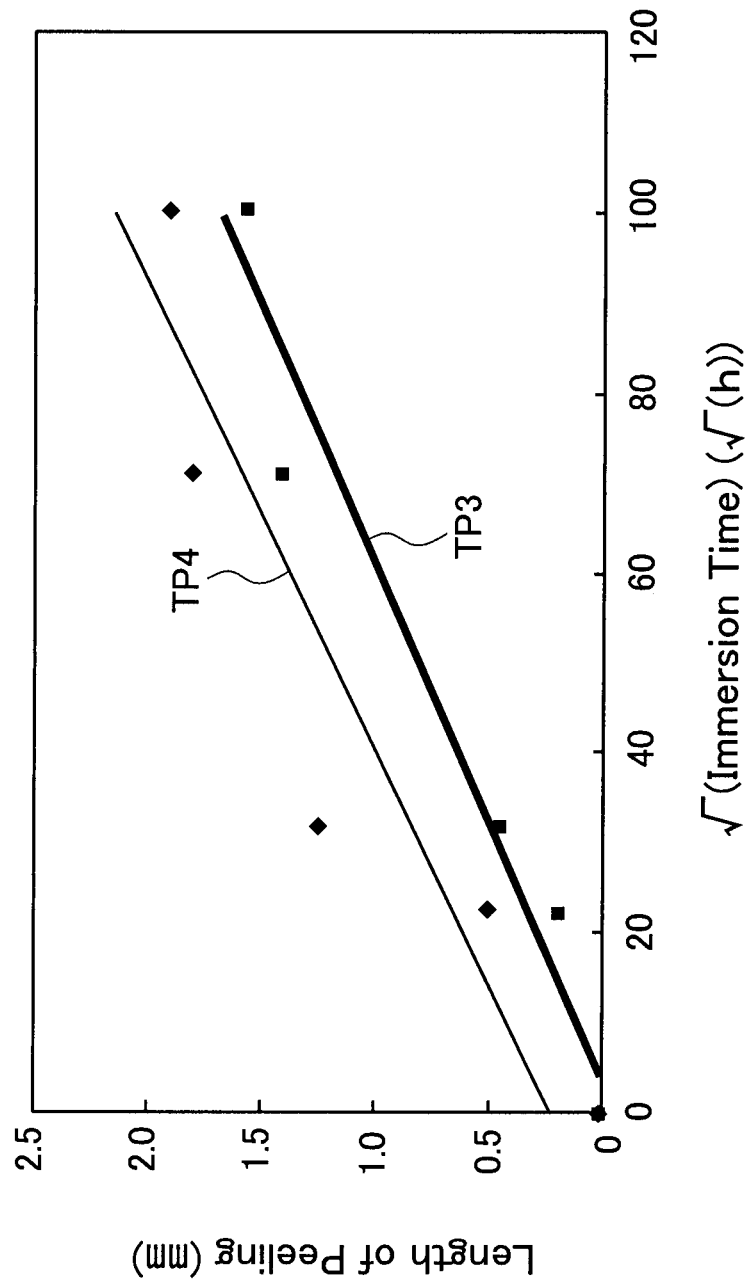
FIG. 9 is a graph showing a relationship of the sealing performance between the resin member and the terminal member vs. square roots of the immersion time.

The measurement results are shown in FIG. 9. Since the measurement results with test pieces using the silane coupling agent revealed that there is a correlation between the peeling length and square roots of the immersion time, FIG. 9 shows the relation of the sealing performance (peeling length)

between the resin member and the terminal member vs. the square roots of the immersion time.

The peeling lengths of the third test piece TP3 and the fourth test piece TP4 both increased linearly as the square root of the immersion time increased. The graph representing the fourth test piece TP4 is constantly located higher than the graph of the third test piece TP3. This indicates that the sealing performance between the negative electrode resin member 130 and the negative electrode terminal member 150 simulated by the fourth test piece TP4 deteriorates earlier than the sealing performance between the positive electrode resin member 120 and the positive electrode terminal member 140 simulated by the third test piece TP3. Specifically, it indicates that the seal durability between the negative electrode resin member 130 and the negative electrode terminal member 150 is poorer than the seal durability between the positive electrode resin member 120 and the positive electrode terminal member 140.

Based on the above results, the negative electrode sealing length L4 (7.0 mm) in the negative electrode terminal member 150 of the battery 101 according to Modified Embodiment 1 is made longer than the positive electrode sealing length L3 (6.3 mm) in the positive electrode terminal member 140 (L4>L3). These values of the positive electrode sealing length L3 and the negative electrode sealing length L4 were determined in consideration of the balance of the seal durability between the positive electrode and negative electrode.

In the battery 101 of Modified Embodiment 1, the positive electrode resin adhesion surface 143XF and the negative electrode resin adhesion surface 153XF have been subjected to a surface treatment with a silane coupling agent. Furthermore, the negative electrode sealing length L4 is made longer than the positive electrode sealing length L3. Therefore, the seal durability of both electrodes can be improved, and also an appropriate balance can be achieved between the seal durability between the negative electrode resin member 130 and the negative electrode terminal member 150 and the seal durability on the positive electrode side.

The method for manufacturing the battery 101 of Modified Embodiment 1 is different from the method of manufacturing the battery 1 of Embodiment 1 in that the silane coupling agent is applied beforehand to a region of the positive electrode terminal member 140 that forms the positive electrode resin adhesion surface 143XF and a region of the negative electrode terminal member 150 that forms the negative electrode resin adhesion surface 153XF instead of these regions being subjected to organic plating.

More specifically, this silane coupling agent is applied such that, the positive electrode terminal member 140 and the negative electrode terminal member 150 are each immersed in the silane coupling agent containing a bis-silane compound for a predetermined time, after which they are dried.

The step of securing the positive electrode terminal member 140 and the negative electrode terminal member 150 to the sealing lid 11 and subsequent steps are performed similarly to the method for manufacturing the battery 1 of Embodiment 1, and therefore description thereof will be omitted.

Embodiment 2

Figure 10:
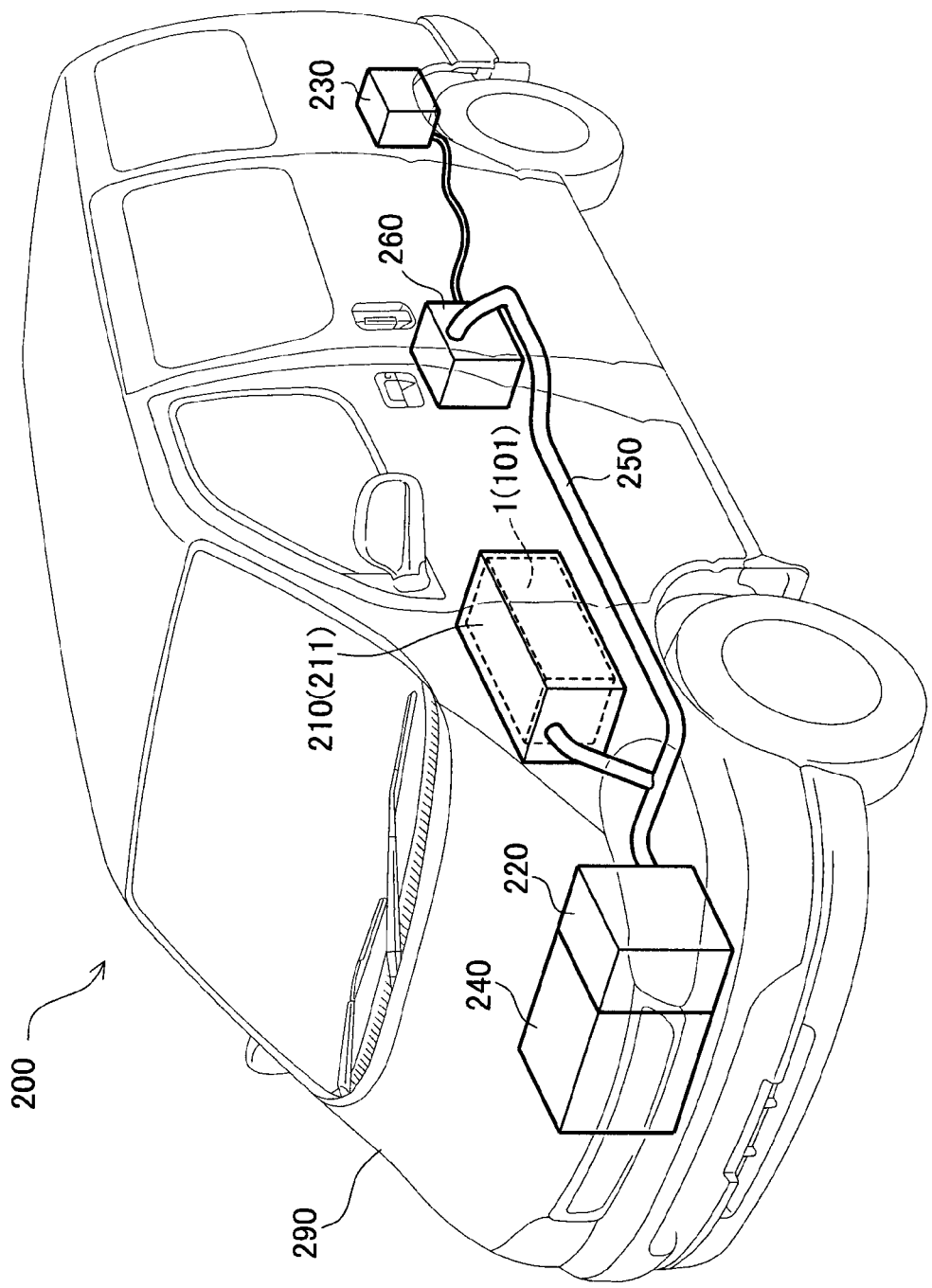
FIG. 10 is an explanatory view of a vehicle of Embodiment 2.

A vehicle 200 according to Embodiment 2 has a battery pack 210 including a plurality of the batteries 1 or 101 described above. More specifically, as shown in FIG. 10, the vehicle 200 is a hybrid car driven with an engine 240, a front motor 220, and a rear motor 230 used in combination. This vehicle 200 includes a vehicle body 290, the engine 240, the front motor 220 attached thereto, the rear motor 230, a cable 250, an inverter 260, and the battery pack 210 in the shape of a rectangular box. The battery pack 210 contains a plurality of batteries 1 or 101 according to Embodiment 1 or Modified Embodiment 1 described above inside a battery case 211 in the shape of a rectangular box.

As described above, the vehicle 200 according to Embodiment 2 has one of the above-described batteries 1 and 101 mounted thereon, and the vehicle 200 using the battery 1 or 101 with good durability can thus be provided.

Embodiment 3

Figure 11:
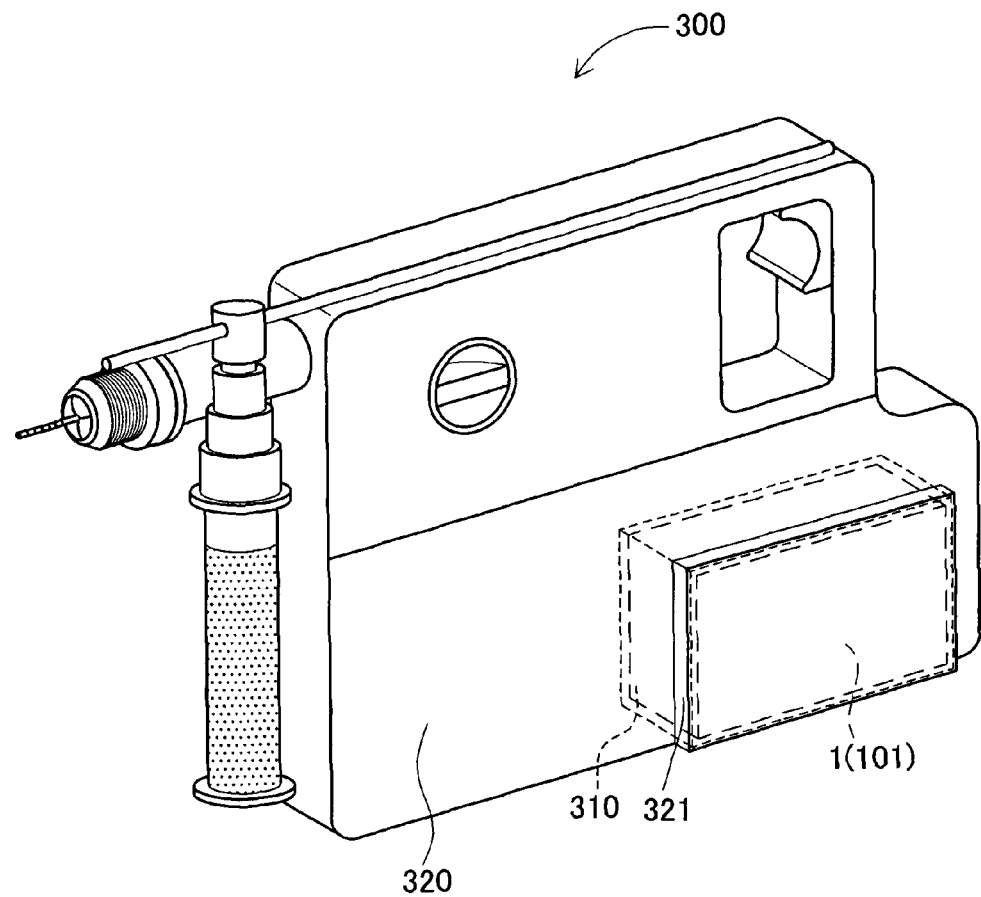
FIG. 11 is an explanatory view of a battery-mounting device of Embodiment 3.

A hammer drill 300 according to Embodiment 3 has a battery pack 310 including the batteries 1 or 101 described above mounted therein. As shown in FIG. 11, it is a battery-mounting device including the battery pack 310 and a main body 320. The battery pack 310 is removably accommodated in a bottom part 321 of the main body 320 of the hammer drill 300.

As described above, the hammer drill 300 according to Embodiment 3 has the above-described batteries 1 or 101 mounted therein, and the battery-mounting device using the battery 1 or 101 with good durability can thus be provided.

While the present invention has been described in conjunction with Embodiments 1 to 3 and Modified Embodiment 1 above, it will be appreciated that the present invention is not restricted to the embodiments above and may be changed suitably and applied without departing from the scope of the invention.

For example, while both the positive electrode resin member and the negative electrode resin member were illustrated as being formed by one injection molding process in Embodiment 1 and others, these members each may be formed from two or more resin parts. Also, while the positive electrode terminal exposed portions 42 and 142, and the negative electrode terminal exposed portions 52 and 152, were illustrated as being bent in a crank shape in Embodiment 1 and others, there is no limitation on the shape. For example, the positive electrode terminal exposed portion (negative electrode terminal exposed portion) may be formed in a square plate-like shape extending upwards in FIG. 2 from the positive electrode terminal passage portion 43 or 143 (negative electrode terminal passage portion 53 or 153).

The invention claimed is:
1. A battery including:
a power generating element including a positive electrode plate and a negative electrode plate;
a battery case accommodating the power generating element;
a positive electrode terminal member made of aluminum, electrically connected to the positive electrode plate, and extending from inside to outside of the battery case;
a negative electrode terminal member made of copper, electrically connected to the negative electrode plate, and extending from the inside to the outside of the battery case;
a positive electrode resin member made of an insulating resin, interposed between the positive electrode terminal member and the battery case to insulate therebetween, and covering the periphery of part of the positive electrode terminal member in tight contact therewith; and
a negative electrode resin member made of an insulating resin, interposed between the negative electrode terminal member and the battery case to insulate therebetween, and covering the periphery of part of the negative electrode terminal member in tight contact therewith, wherein a positive electrode resin adhesion surface of the positive electrode terminal member with which the positive electrode resin member makes tight contact, and a negative electrode resin adhesion surface of the negative electrode terminal member with which the negative electrode resin member makes tight contact, are both surface-treated to enhance adhesion with respect to the positive electrode resin member and the negative electrode resin member, and wherein a negative electrode sealing length, which is a length of the shortest one of negative electrode seal paths that run on the negative electrode resin adhesion surface from the inside to the outside of the battery case, is formed longer than a positive electrode sealing length, which is a length of the shortest one of positive electrode seal paths that run on the positive electrode resin adhesion surface from the inside to the outside of the battery case.

2. The battery according to claim 1, wherein the positive electrode resin adhesion surface and the negative electrode resin adhesion surface have been subjected to organic plating.

3. The battery according to claim 1, wherein the positive electrode resin adhesion surface and the negative electrode resin adhesion surface have been subjected to the surface treatment with a silane coupling agent.

4. A vehicle having the battery according to claim 1 mounted therein, wherein the vehicle uses electric energy generated by the battery for all or part of a power source.

5. A battery-mounting device having the battery according to claim 1 mounted therein, wherein the device uses electric energy generated by the battery for all or part of an energy source.

6. A vehicle having the battery according to claim 2 mounted therein, wherein the vehicle uses electric energy generated by the battery for all or part of a power source.

7. A vehicle having the battery according to claim 3 mounted therein, wherein the vehicle uses electric energy generated by the battery for all or part of a power source.

8. A battery-mounting device having the battery according to claim 2 mounted therein, wherein the device uses electric energy generated by the battery for all or part of an energy source.

9. A battery-mounting device having the battery according to claim 3 mounted therein, wherein the device uses electric energy generated by the battery for all or part of an energy source.

* * * * *